(12) United States Patent
Gupta et al.

(10) Patent No.: US 10,740,940 B2
(45) Date of Patent: *Aug. 11, 2020

(54) AUTOMATIC GENERATION OF FUNDUS DRAWINGS

(71) Applicant: MICROSOFT TECHNOLOGY LICENSING, LLC, Redmond, WA (US)

(72) Inventors: Prashant Gupta, Gachibowli (IN); Manish Gupta, Hyderabad (IN); Mithun Das Gupta, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/200,093

(22) Filed: Nov. 26, 2018

(65) Prior Publication Data

US 2019/0096111 A1 Mar. 28, 2019

Related U.S. Application Data

(63) Continuation of application No. 15/374,027, filed on Dec. 9, 2016, now Pat. No. 10,163,241.

(51) Int. Cl.

| G06T 11/60 | (2006.01) |
| G06T 7/00 | (2017.01) |
| G06T 7/11 | (2017.01) |
| G06T 11/00 | (2006.01) |

(52) U.S. Cl.
CPC .......... *G06T 11/60* (2013.01); *G06T 7/0012* (2013.01); *G06T 7/11* (2017.01); *G06T 11/00* (2013.01); *G06T 2207/10024* (2013.01); *G06T 2207/20081* (2013.01); *G06T 2207/20084* (2013.01); *G06T 2207/30041* (2013.01); *G06T 2210/41* (2013.01)

(58) Field of Classification Search
CPC ................. A61B 3/12; A61B 5/14555; G06T 2207/30041; G06T 2207/30101; G06T 2210/41; G06T 7/0012; G06T 7/11; G06T 7/33; G06T 11/60; G06T 11/00; G06K 2009/00932; G06K 9/0061
See application file for complete search history.

(56) References Cited

U.S. PATENT DOCUMENTS 9,336,433 B1 * 5/2016 Ortiz .................. G06K 9/00228
10,163,241 B2 * 12/2018 Gupta ..................... G06T 11/60
(Continued)

FOREIGN PATENT DOCUMENTS

KR 20170039689 A * 4/2017 ........... A61K 9/0053

*Primary Examiner* — Jingge Wu
(74) *Attorney, Agent, or Firm* — Fiala & Weaver P.L.L.C.

(57) ABSTRACT

Techniques for automating the generation and analysis of fundus drawings are described. Captured images undergo image processing to extract information about image features. Fundus images are generated and recommended labels for the fundus drawing are generated. Fundus drawings can be analyzed and undergo textual processing to extract existing labels. Machine learning models and co-occurrence analysis can be applied to collections of fundus images and drawings to gather information about commonly associated labels, label locations, and user information. The most frequently used labels associated with the image can be identified to improve recommendations and personalize labels.

20 Claims, 6 Drawing Sheets

(56) References Cited

U.S. PATENT DOCUMENTS

| | | | |
|---|---|---|---|
| 2007/0115481 A1* | 5/2007 | Toth | A61B 3/0025 356/511 |
| 2008/0007691 A1* | 1/2008 | Mihashi | A61B 3/10 351/206 |
| 2011/0129134 A1* | 6/2011 | de Oliveira e Ramos | A61B 3/0041 382/128 |
| 2012/0065518 A1* | 3/2012 | Mangoubi | A61B 3/12 600/473 |
| 2012/0213423 A1* | 8/2012 | Xu | A61B 5/0073 382/131 |
| 2012/0257164 A1* | 10/2012 | Zee | A61B 3/12 351/206 |
| 2013/0217996 A1* | 8/2013 | Finkelstein | A61B 5/1075 600/407 |
| 2013/0301889 A1* | 11/2013 | Abramoff | G06K 9/00 382/128 |
| 2014/0028976 A1* | 1/2014 | Tanassi | A61B 3/152 351/208 |
| 2015/0265144 A1* | 9/2015 | Burlina | A61B 3/10 351/206 |
| 2015/0379708 A1* | 12/2015 | Abramoff | G06T 7/0012 382/128 |
| 2016/0034646 A1* | 2/2016 | Acharya | G06F 19/00 705/3 |
| 2016/0324413 A1* | 11/2016 | Kim | A61B 3/12 |
| 2017/0039412 A1* | 2/2017 | Solanki | G16H 30/20 |
| 2017/0039689 A1* | 2/2017 | Solanki | G16H 30/20 |
| 2017/0270653 A1* | 9/2017 | Garnavi | G06T 7/0002 |

\* cited by examiner

AUTOMATIC GENERATION OF FUNDUS DRAWINGS

CROSS-REFERENCE TO RELATED APPLICATIONS

This application is a continuation of U.S. patent application Ser. No. 15/374,027, filed Dec. 9, 2016, the entirety of which is incorporated by reference herein.

TECHNICAL FIELD

The present invention generally relates to image processing and analysis, and more specifically, analyzing image features to assist in generating labeled drawings.

BACKGROUND

A fundus image is an image of an eye taken by cameras to obtain information about the eye's condition. Optometrists and ophthalmologists use those images to manually create fundus drawings, which record notes about the eye's condition. Fundus drawings can contain multiple types of markings, colors and labels to indicate different features. For example, blue stippled, circle markings can indicate cystoid degeneration, interrupted lines can outline a change in area or folds of detached retina, and yellow stippled markings can indicate Drusen.

Since fundus drawings are made manually, the task of creating the drawing can be time consuming. Manual drawings may also lead to inconsistency across various drawings from multiple doctors. Furthermore, doctors often keep the fundus drawings in their records but do not keep the original fundus image. As a result, errors, missing labels, and incompleteness can be hard to detect.

SUMMARY

Systems and methods of automating the generation of fundus drawings are disclosed herein. In various embodiments, images undergo image processing to extract information about features of the eye or other subject of the image. Extracted features can be used to generate a fundus drawing. Recommended labels for the fundus drawing may be automatically generated. Fundus drawings can also be analyzed and undergo textual processing to extract existing labels. Machine learning models employing co-occurrence analysis can be applied to collections of fundus images and drawings to gather information about commonly associated labels, label location, and user information. In some embodiments, the most frequently used labels by a doctor or other user associated with the image may be determined, in order to improve recommendations and personalize labels. The described systems and methods may be applied to analysis of other types of images.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The foregoing Summary, as well as the following Detailed Description, is better understood when read in conjunction with the appended figures and drawings. In order to illustrate the present disclosure, various aspects of the disclosure are illustrated. However the disclosure is not limited to the specific aspects discussed herein. The following figures are included.

DETAILED DESCRIPTION OF ILLUSTRATIVE EMBODIMENTS

Figure 1:
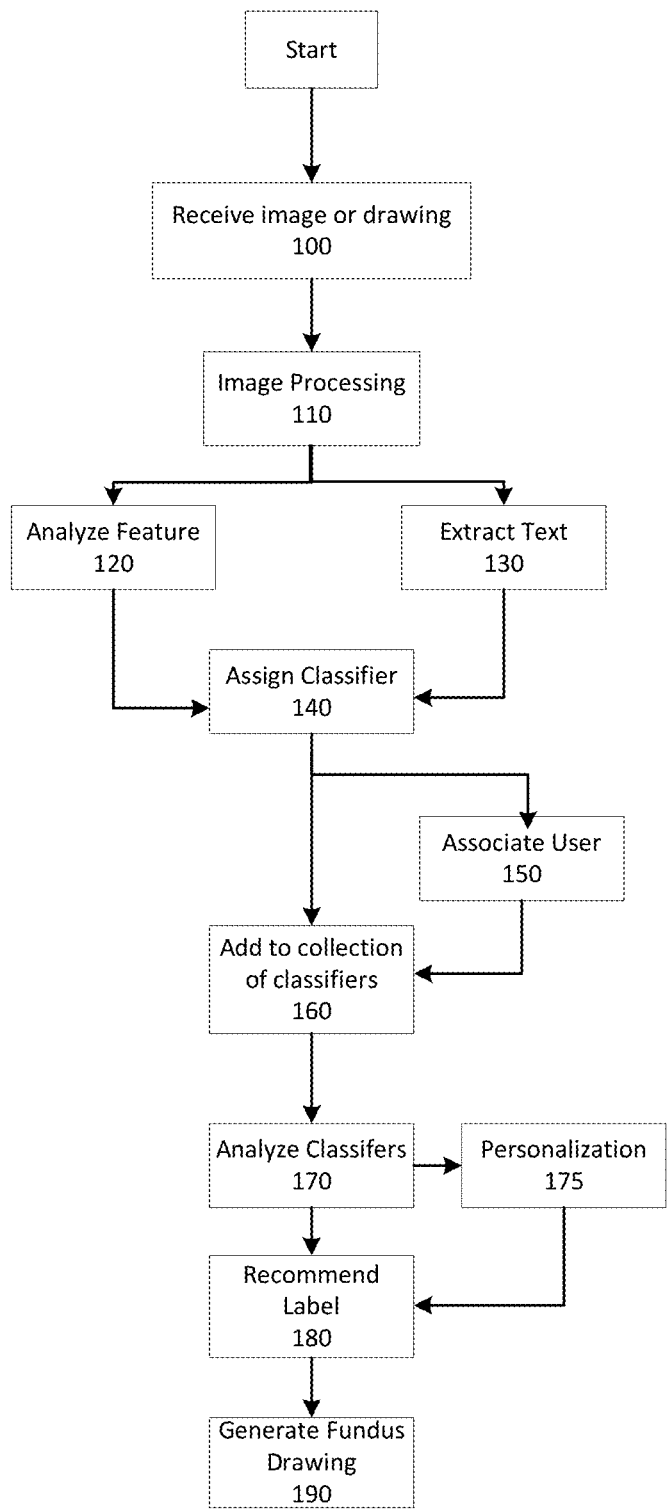
FIG. 1 is a diagram of an example process for generating fundus drawings.

In various embodiments described herein, images may be analyzed and label recommendations may be generated to assist in generation and editing of fundus drawings. FIG. 1 illustrates an example process where a fundus image or drawing is generated and/or analyzed using image processing and recommendation models. In this non-limiting example, an image or a fundus drawing 100 is received. Image processing models 110 may be applied to analyze image features 120 and extract text 130 associated with the image or fundus drawing. Identified features and text may be assigned a classifier 140, which may be further associated with a user 150.

Users may include doctors, technicians, or other individuals who are associated with labeling, updating, or otherwise working with the fundus image or drawing. In various embodiments, user information can be obtained from a label on the drawing itself, a global label associated with the image, or from metadata information, for example. Alternatively, users can be assigned to the image or fundus drawing. Multiple users may be associated with a single image or fundus drawing.

The various examples used in this disclosure are provided in the context of a fundus image or drawing which involves capturing an image of the back of the eye. For example, specialized cameras may be used to capture images of structures such as the central and peripheral retina, optic disc and macula. Such images may be used for examination and treatment purpose by ophthalmologists and optometrists. However, but it should be understood that the described principles may be applied to other scenarios where images are captured and analyzed. Such examples in the health profession may include medical and dental applications. Additionally, the disclosure may be applicable in other industries and professions. For example, the described principles may be used in conjunction with processing and analytical applications and services for use in botanical, zoological, and other fields where the analysis of captured images may be employed.

Continuing with FIG. 1, the classifiers may be added to a collection of classifiers 160, which can include information obtained from other fundus images, drawings, and corresponding pairs. The collection of classifiers 160 may be utilized in recommendation models 180, in order to analyze and recommend labels. Label recommendations can be further applied to generate labeled fundus drawings 190. The recommendations may be predictive (e.g. based on identified features or labels on the original image or drawings) or personalized (e.g. based on a user's historical set of labels).

Figure 2:
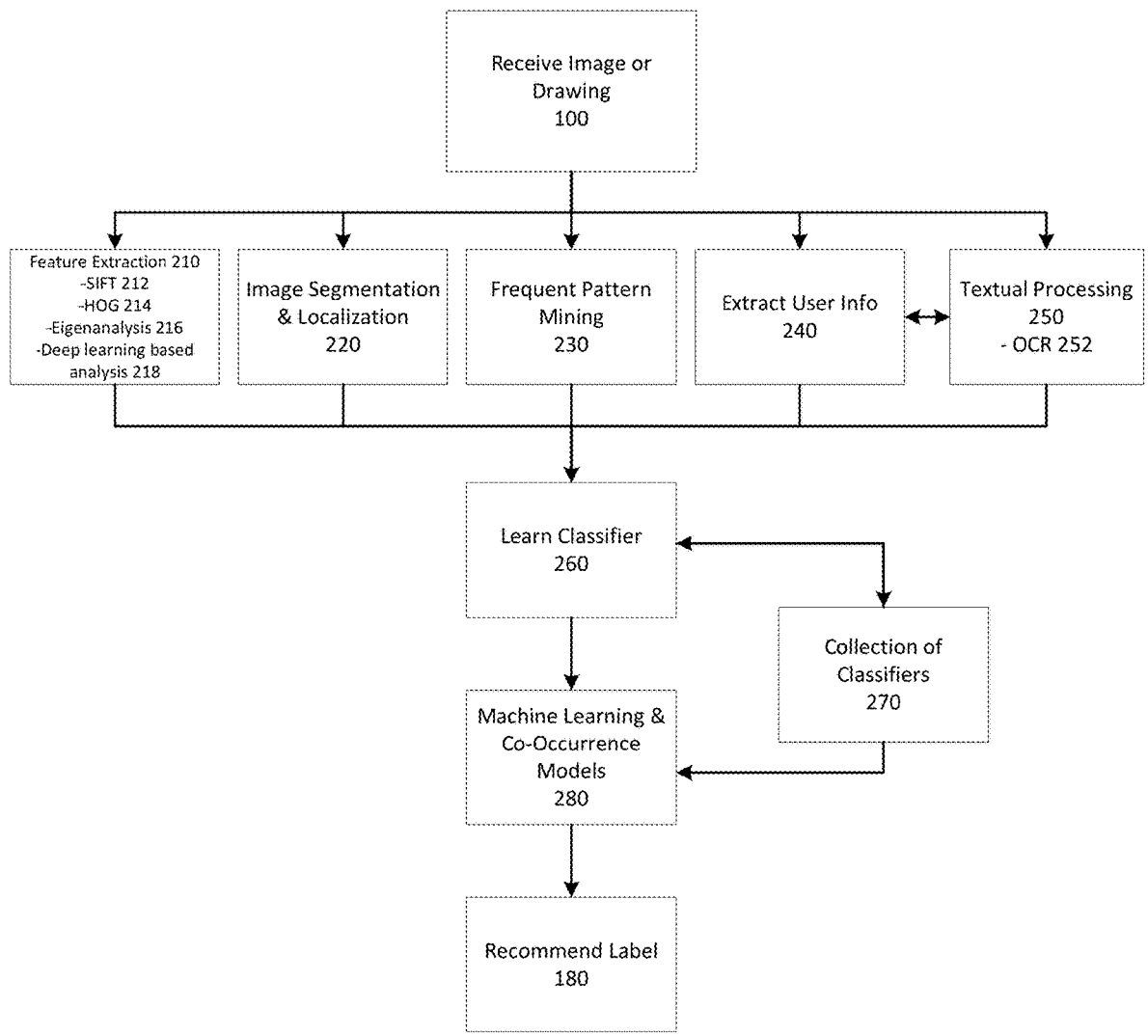
FIG. 2 is a flow chart of an image processing model.
Figure 3:
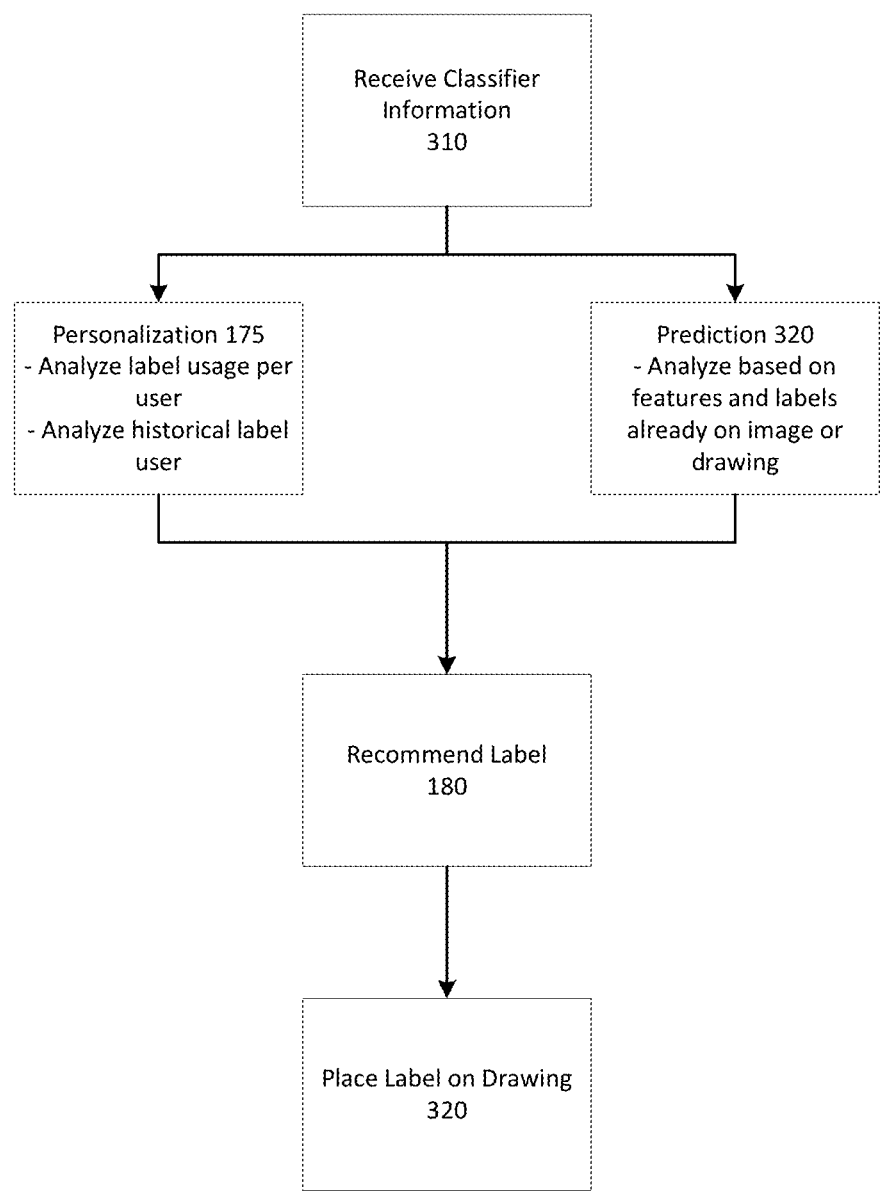
FIG. 3 is a flow chart of a recommendation model.

FIGS. 2 and 3 illustrate an image processing and recommendation model that can be utilized in one embodiment. FIGS. 2 and 3 can be described in conjunction with the labeled fundus drawing 400 illustrated in FIG. 4. The image processing model in FIG. 2 may begin when an image or drawing is received 100. Image processing algorithms can be applied to identify useful information, which may include, for example, indications of a present image feature, such as a scar, Drusen, or other condition 420, 430, 440, 450, general image information (e.g. right/left eye 410) or information about a user who created or is associated with the drawing.

Feature extraction techniques may include scale-invariant feature transforms (SIFT) 212 and histograms of oriented gradients (HOG) 214. Deep learning-based analyses 218, such as convolutional neural networks, may be used to derive semantic image representation features, and eigenanalysis 216 can be performed to derive spectral features. Image segmentation and localization techniques 220, as well as frequent pattern mining 230, can be employed to identify noteworthy features and their locations on the image.

Figure 4:
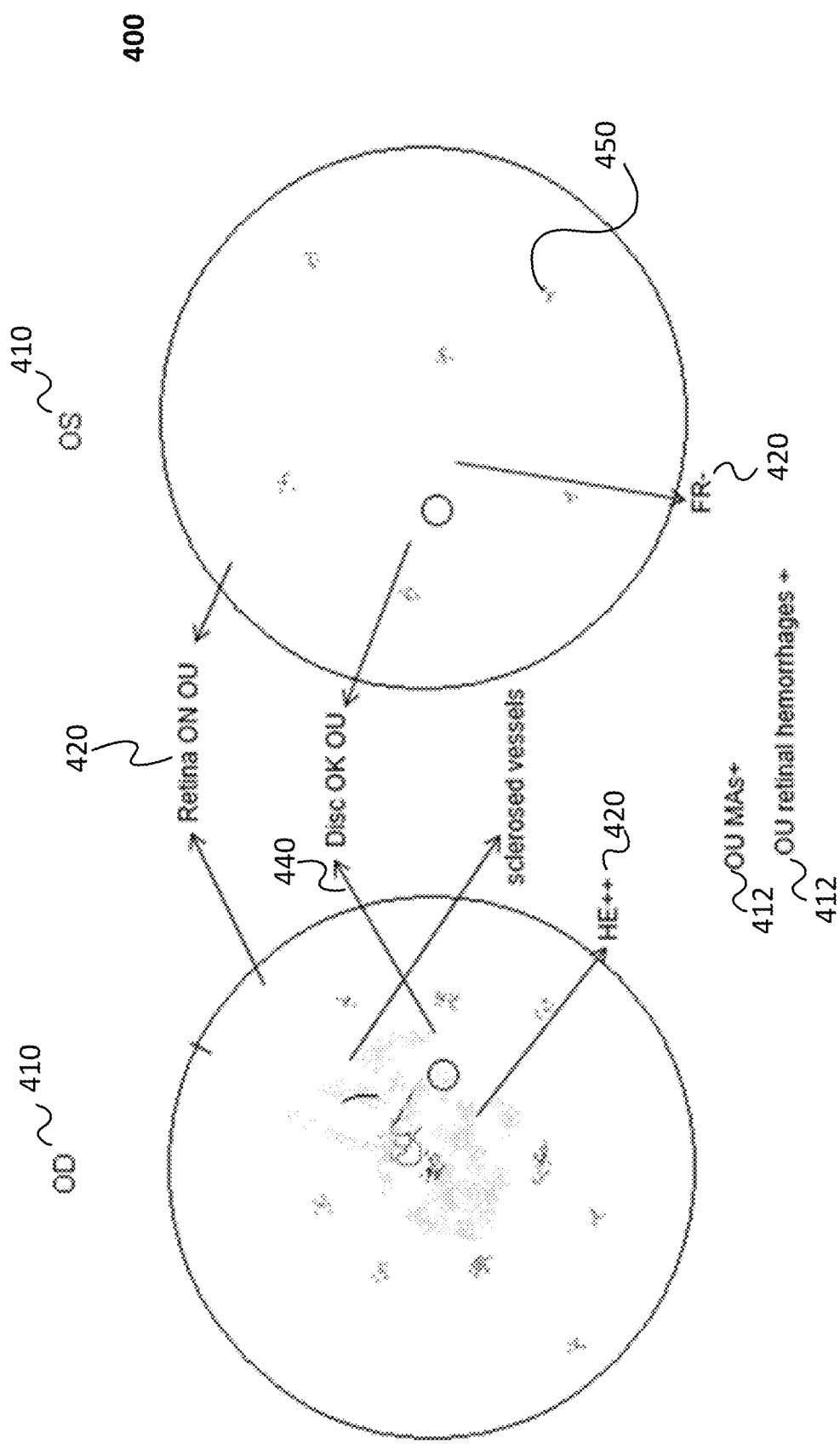
FIG. 4 is a labeled fundus drawing that may be analyzed or generated using the processes described herein.

Identifying existing feature and label locations on an image or drawing may be useful to further refine label recommendations and improve accuracy. In an embodiment, when the position of a label or noteworthy feature is identified, that information may be compared to a known collection of analyzed, labeled drawings. Recommendation models can use the location of similar labels on drawings in the collection in order to generate a location prediction for the label on the drawing being analyzed. In another example, labels may be designated as global or local, with global labels identifying aspects of the drawing or image as a whole (e.g., right eye—OD, the left eye—OS, or both eyes—OU), and local labels corresponding to a feature at a particular location on the image or drawing (e.g., a scar). In FIG. 4, for example, the OU labels 412 indicate a global label, whereas markings 450 and text 420, 440 corresponding to a specific location on the drawing, indicate local labels. If a label is identified as local in nature, co-occurrence analysis can be performed to compute its position in relation to other labels, as described herein.

Fundus images and drawings can also undergo textual processing methods 250, such as Optical Character Recognition (OCR) 252 to extract any textual information that is present (e.g. text labels on the drawing that indicate an eye feature). Textual processing 250 may be used in combination with techniques to extract user information 240, in order to identify a name or other identifier for a user associated with the fundus drawing or image. All of the described image processing techniques can be used alone or in combination with methods described herein, as well as with other methods that are known and used by those skilled in the art.

Continuing with FIG. 2, models employing the described image processing techniques can be trained to learn classifiers 260 for the identified image feature and textual feature. A collection of classifiers 270, containing information from a plurality of labeled fundus images and drawings, can also be utilized to assist with generating classifiers 260. The collection 270 may include, for example, an online database containing information about multiple fundus images, drawings, and corresponding pairs. Additionally and optionally, the collection 270 may include a local collection of information. For example, corresponding pairs of fundus images and drawings in the collection 270 can be overlapped to identify matching regions, classifiers and assist in generating classifiers for identified features and text in the image being analyzed. Additionally, once a classifier is learned 260, it may be added to the collection of classifiers 270 and used in subsequent processes and analyses.

Machine learning models and/or models employing co-occurrence analysis techniques 280 can use the learned classifiers 260 and the collection of classifiers 270 to identify sets of labels that are associated with each other. The models may make recommendations for labels 180 that should be associated with the image or drawing, and the location of such labels.

In another embodiment, if a user is associated with the fundus drawing (e.g. by name, employee number, identifier, etc.), machine learning and co-occurrence models 280 can be utilized to collect information and compute the most frequent labels used by that user. That information can then be used to recommend additional labels 180. Additionally, once a user has applied labels to a fundus drawing, the models 280 can learn and suggest additional labels that frequently co-occurred in the past.

FIG. 3 is a diagram illustrating a recommendation model that can be utilized in an embodiment. The recommendation model can receive classifier information 310 indicative of identified features, users and/or information obtained from fundus drawings, images, collections of classifiers 270 and corresponding images. From that information, recommendations can be made through personalized or predictive techniques.

Personalized recommendations 175 may be based on a user's historical set of labels. For example, a doctor or specialist might use certain labels more frequently, or not at all depending on his/her specialty, or any number of factors. Personalized recommendation 175 may analyze previous label usage through the machine learning/co-occurrence methods 280 previously described, and recommend user specific labels 180. Predictive recommendations 320 may be based on identified features, existing labels and classifiers obtained from the image or drawing 260, and any applicable information from the collection of classifiers 270. These label recommendations can also indicate a location for the label on the drawing, based on the machine learning/co-occurrence techniques 280 previously described. Once a label is recommended, the model can place the location on a drawing 320, in order to further assist a user in generating labeled drawings.

The described systems and methods can be configured to operate in online or offline modes. A series of models may be built into the offline mode, such as the image processing, text processing, machine learning/co-occurrence, and recommendation models described herein. In the online mode, these models can be utilized to assist the user in generating the fundus drawings.

To further illustrate the processes described in FIGS. 1-3, an example embodiment to generate a labeled fundus drawing (i.e., FIG. 4) is presented. A computing device first receives an original fundus image 100 depicting a pair of eyes. The fundus image is then processed through trained feature extraction models 210 to identify notable features. Since eye conditions, such as swelling or sclerosed vessels, can be identified on fundus images by looking at nerve groupings, size, and color differences throughout the image, feature extraction models 210 are trained to use histograms of oriented gradients to identify common shapes and color patterns that indicate such conditions, in addition to areas of the image where the condition is most likely to present itself.

Additionally, since a fundus image is a 2D representation of a 3D object, the eye's spherical shape may be taken into account when identifying the location of notable features. Eigenanylsis 216, image segmentation and localization 220 algorithms take identified features and account for any spatial offsets, to determine the most accurate location of the feature. The image will then undergo OCR to identify any text that is present on the image, such as a doctor or patient's name. Metadata analysis software will also scan the image to extract any relevant user information 240 like the doctor, technician, or patient that is associated with the image.

The extracted information may be assigned a classifier indicative of the feature or user that it represents, through a model trained to learn and assign classifiers 260. A collection of classifiers 270 from previously analyzed images assists in assigning classifiers to the identified features and information from the current image. For example, the collection 270 may contain several classifiers identifying sclerosed vessels, based on image features from previously analyzed images. The classifier model 260 will receive information extracted from the image, and the collection of classifiers 270 to determine any commonalities, and assign a classifier for the fundus image's feature. If there are no relevant classifiers in the collection 270, the classifier model 260 may assign a new classifier to the feature information received from the fundus image. In either scenario, once a classifier is assigned, it is added to the collection of classifiers 270, so that it can be used to further assist in assigning classifiers to identified features.

Once the identified features have been assigned a classifier 260, recommendation models receive that information 310 and employ machine learning and co-occurrence techniques 280 to recommend a label 180 for a fundus drawing. First, learned classifiers are compared to the collection of classifiers, to identify other commonly associated classifiers. For example, if a classifier indicative of an eye condition, such as sclerosed vessels, is often present with one or more conditions, the machine learning and co-occurrence techniques 280 will predict the presence of those one or more other conditions based on the collection of information. The recommendation model uses a similar technique to personalize predictions 175. When user information is extracted from the image, it becomes associated with the features and subsequent classifiers obtained from the image. The recommendation model will look in the collection of classifiers 270 at that user's historical usage, and make predictions for the current fundus image based on that information.

The recommendation models may then recommend a label 180 to be placed on a diagram, to generate a fundus drawing 190. Labels represent the classifiers obtained from the fundus image, and may be text 420, colors or symbols 440, 450. The recommendation models also specify a placement on the drawing 320, which describe where the noted feature is present. As seen in FIG. 4, textual labels 420 indicate the location on the eye of their indicative features, along with non-textual, color-coded labels 450. Some labels are global 410, 412 and indicate an overall feature of the drawing, like retinal hemorrhaging or other condition present on both eyes 412. The recommendation model goes through the analysis process for all classifiers to generate, predict, and assign labels for the fundus drawing. A similar process can be used to analyze a fundus drawing as well.

Figure 5:
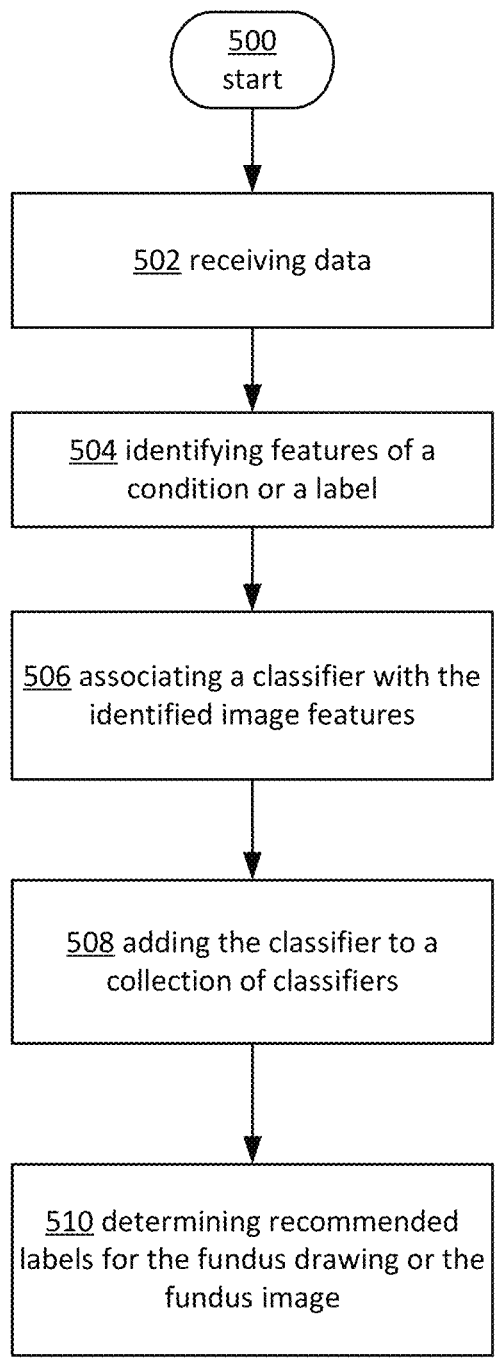
FIG. 5 depicts an example procedure for generating fundus drawings in accordance with this disclosure.

FIG. 5 illustrates an example operational procedure for generating fundus drawings. In an embodiment, the procedure can be implemented at least in part in a system or function on a computing device corresponding to FIG. 6.

Referring to FIG. 5, operation 500 begins the operational procedure. Operation 500 may be followed by operation 502. Operation 502 illustrates receiving data indicative of a fundus image or a fundus drawing. Operation 502 may be followed by operation 504. Operation 504 illustrates identifying one or more image features indicative of a condition or a label.

Operation 504 may be followed by operation 506. Operation 506 illustrates associating a classifier with the identified image features. Operation 506 may be followed by operation 508. Operation 508 illustrates adding the classifier to a collection of classifiers. Operation 508 may be followed by operation 510. Operation 510 illustrates determining recommended labels for the fundus drawing or the fundus image based on previously associated labels, the associated classifier, and the collection of classifiers.

In some embodiments, one or more users may be associated with the classifier. Additionally, the recommended labels may be determined based, at least in part, on labels previously used by the one or more users.

In some embodiments, the one or more image features may be identified using image segmentation processes. Additionally, the one or more image features In some embodiments, identified using one or more of scale invariant feature transforms, histograms of oriented gradients, learning based analyses, and eigenanalysis. Optionally, the one or more image features are identified by extracting textual features. In one embodiment, the one or more image features are identified by identifying sets of labels previously associated with each other within a threshold frequency. In another embodiment, the one or more image features may be identified using machine learning models. The one or more image features may also be identified using co-occurrence analysis.

Figure 6:
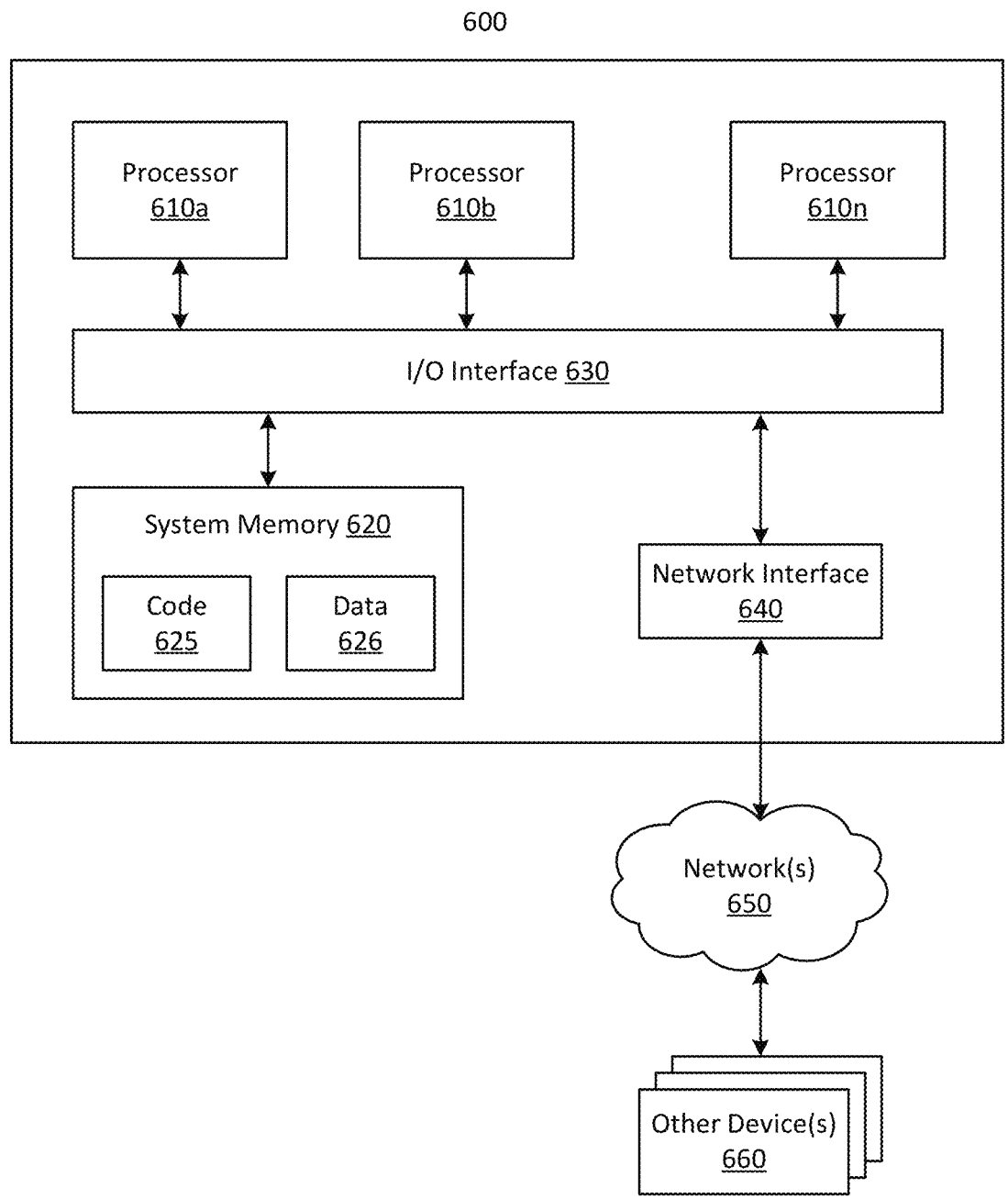
FIG. 6 is an example diagram of a computing device that may be used in conjunction with the disclosed embodiments.

In at least some embodiments, a computing device that implements a portion or all of one or more of the technologies described herein, including the techniques to implement the functionality of a system for generating fundus images and drawings may include a general-purpose computer system that includes or is configured to access one or more computer-accessible media. FIG. 6 illustrates such a general-purpose computing device 600. The general-purpose computing device 600 may be implemented as a mobile device, desktop computer, laptop, or any other type of computing device. Thus the various embodiments described herein may be implemented, for example, on a tablet executing an application. In such an example, the user may be able to access or receive image information and use the tablet executing the application may perform operations as described herein. The image may be provided via another image capture device such as a camera. The image capture device may be coupled to the computing device, or may be integrated with the computing device. In some embodiments, some of the functionality may be implemented in the general-purpose computing device 600 and some functionality may be implemented in a remote computing device or computing environment, such as a cloud-based system.

In the illustrated embodiment, computing device 600 includes one or more processors 610*a*, 610*b*, and/or 610*n* (which may be referred herein singularly as "a processor 610" or in the plural as "the processors 610") coupled to a system memory 620 via an input/output (I/O) interface 630. Computing device 600 further includes a network interface 640 coupled to I/O interface 630.

In various embodiments, computing device 600 may be a uniprocessor system including one processor 610 or a multiprocessor system including several processors 610 (e.g., two, four, eight, or another suitable number). Processors 610 may be any suitable processors capable of executing instructions. For example, in various embodiments, processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

System memory 620 may be configured to store instructions and data accessible by processor(s) 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 620 as code 625 and data 626.

In one embodiment, I/O interface 630 may be configured to coordinate I/O traffic between processor 610, system memory 620, and any peripheral devices in the device, including network interface 640 or other peripheral interfaces. In some embodiments, I/O interface 630 may perform any necessary protocol, timing, or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computing device 600 and other device or devices 660 attached to a network or network(s) 650, such as other computer systems or devices as illustrated in FIGS. 1 through 5, for example. In various embodiments, network interface 640 may support communication via any suitable wired or wireless general data networks, such as types of Ethernet networks, for example. Additionally, network interface 640 may support communication via telecommunications/telephony networks such as analog voice networks or digital fiber communications networks, via storage area networks such as Fibre Channel SANs or via any other suitable type of network and/or protocol.

In some embodiments, system memory 620 may be one embodiment of a computer-accessible medium configured to store program instructions and data as described above for FIGS. 1-6 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 600 via I/O interface 630. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 600 as system memory 620 or another type of memory. Further, a computer-accessible medium may include transmission media or signals such as electrical, electromagnetic or digital signals, conveyed via a communication medium such as a network and/or a wireless link, such as may be implemented via network interface 640. Portions or all of multiple computing devices, such as those illustrated in FIG. 6, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices. For purposes of this specification and the claims, the phrase "computer-readable storage medium" and variations thereof, does not include waves, signals, and/or other transitory and/or intangible communication media.

A number of different types of computing devices may be used singly or in combination to implement the resources of the service provider in different embodiments, including general-purpose or special-purpose computer servers, storage devices, network devices, and the like.

As used herein, the phrase "configured to" may encompass any way that any kind of structural component can be constructed to perform an identified operation. The structural component can be configured to perform an operation using software, hardware, firmware and the like, or any combinations thereof. The term "logic" may encompass any functionality for performing a task. For instance, each operation illustrated in the flowcharts corresponds to logic for performing that operation. An operation can be performed using software, hardware, firmware, physical electronic circuits, and the like, or any combinations thereof. The terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, or media.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed:

1. A method implemented by one or more computing devices, comprising:
   receiving data indicative of a first medical image;
   identifying one or more image features, the one or more image features being indicative of a condition or a label associated with the first medical image;
   generating a second medical image based on the one or more image features;
   associating a classifier with the one or more image features; and
   applying one or more recommendation models to identify, based at least in part on the associated classifier, one or more recommended labels and a label location within the second medical image for each of the one or more recommended labels, one of the one or more recommendation models identifying the label location based at least on performing a co-occurrence analysis to compute a location of the one or more recommended labels in relation to another label.

2. The method of claim 1, wherein the first medical image is a fundus image and wherein the second medical image is a fundus drawing.

3. The method of claim 1, wherein applying the one or more recommendation models to identify, based at least in part on the associated classifier, the one or more recommended labels and the label location within the second medical image for each of the one or more recommended labels comprises:
   predicting a label location within the second medical image for a recommended label based on a location of a label that is deemed to be similar to the recommended label in one or more other medical images.

4. The method of claim 1, wherein applying the one or more recommendation models to identify, based at least in part on the associated classifier, the one or more recommended labels and the label location within the second medical image for each of the one or more recommended labels comprises:
   designating a particular recommended label as a global label or a local label; and
   in response to designating the particular recommended label as a local label, performing a co-occurrence analysis to compute a location of the particular recommended label in relation to another label.

5. The method of claim 1, wherein applying the one or more recommendation models to identify, based at least in part on the associated classifier, the one or more recommended labels and the label location within the second medical image for each of the one or more recommended labels comprises:

identifying one or more users associated with the associated classifier; and identifying a recommended label based on labels previously used by the identified one or more users.

6. The method of claim 1, wherein identifying the one or more image features comprises using an image segmentation technique.

7. The method of claim 1, wherein identifying the one or more image features comprises using one or more of a scale invariant feature transform, histogram of oriented gradients, learning based analysis, and eigenanalysis.

8. The method of claim 1, wherein identifying the one or more image features comprises extracting textual features.

9. The method of claim 1, wherein associating the classifier with the one or more image features comprises:

associating a classifier selected from a set of classifiers to the one or more image features; or assigning a new classifier to the one or more image features responsive to determining that no relevant classifiers are present in the preexisting set of classifiers.

10. A system, comprising:

one or more processors; and a memory storing computer readable instructions that, when executed by the one or more processors, cause the system to perform operations comprising:

identifying one or more image features indicative of condition or a label associated with a medical image;

identifying a classifier to be associated with the one or more image features; and applying one or more recommendation models to identify, based at least in part on the associated classifier, one or more recommended labels and a label location within the medical image for each of the one or more recommended labels, one of the one or more recommendation models identifying the label location based at least on performing a co-occurrence analysis to compute a location of the one or more recommended labels in relation to another label.

11. The system of claim 10, wherein the medical image is one of a fundus image or a fundus drawing.

12. The system of claim 10, wherein applying the one or more recommendation models to identify, based at least in part on the associated classifier, the one or more recommended labels and the label location within the medical image for each of the one or more recommended labels comprises:

predicting a label location within the medical image for a recommended label based on a location of a label that is deemed to be similar to the recommended label in one or more other medical images.

13. The system of claim 10, wherein applying the one or more recommendation models to identify, based at least in part on the associated classifier, the one or more recommended labels and the label location within the medical image for each of the one or more recommended labels comprises:

designating a particular recommended label as a global label or a local label; and in response to designating the particular recommended label as a local label, performing a co-occurrence analysis to compute a location of the particular recommended label in relation to another label.

14. The system of claim 10, wherein applying the one or more recommendation models to identify, based at least in part on the associated classifier, the one or more recommended labels and the label location within the medical image for each of the one or more recommended labels comprises:

identifying one or more users associated with the associated classifier; and identifying a recommended label based on labels previously used by the identified one or more users.

15. The system of claim 10, wherein identifying the one or more image features comprises using an image segmentation technique.

16. The system of claim 10, wherein identifying the one or more image features comprises using one or more of a scale invariant feature transform, histogram of oriented gradients, learning based analysis, and eigenanalysis.

17. The system of claim 10, wherein identifying the one or more image features comprises extracting textual features.

18. A method implemented by one or more computing devices, comprising:

identifying one or more image features indicative of a condition or a label associated with a medical image;

associating a classifier with the one or more image features;

identifying one or more recommended labels; and applying one or more recommendation models to identify, based at least in part on the associated classifier, a label location within the medical image for each of the one or more recommended labels, one of the one or more recommendation models identifying the label location based at least on performing a co-occurrence analysis to compute a location of the one or more recommended labels in relation to another label.

19. The method of claim 18, wherein applying the one or more recommendation models to identify, based at least in part on the associated classifier, the label location within the medical image for each of the one or more recommended labels comprises:

predicting a label location within the medical image for a recommended label based on a location of a label that is deemed to be similar to the recommended label in one or more other medical images.

20. The method of claim 18, wherein applying the one or more recommendation models to identify, based at least in part on the associated classifier, the label location within the medical image for each of the one or more recommended labels comprises:

designating a particular recommended label as a global label or a local label; and in response to designating the particular recommended label as a local label, performing a co-occurrence analysis to compute a location of the particular recommended label in relation to another label.

* * * * *